United States Patent [19]
Gordon

[11] 4,247,140
[45] Jan. 27, 1981

[54] UNIVERSAL TOOL

[76] Inventor: Jing R. Gordon, 64 Borensvagen, 121 68 Johanneshov, Sweden

[21] Appl. No.: 64,469

[22] Filed: Aug. 7, 1979

[51] Int. Cl.³ .............................................. B65G 7/12
[52] U.S. Cl. ...................................... 296/26; 294/33; 24/139
[58] Field of Search ...................... 294/26, 3, 15, 50.6, 294/99 R, 995, 16, 33; 24/139

[56] References Cited
U.S. PATENT DOCUMENTS

| 1,127,676 | 2/1915 | Ramm | 24/139 |
| 2,096,263 | 10/1937 | Ruhlman | 294/33 |
| 2,607,096 | 8/1952 | Sowsa | 24/139 |

Primary Examiner—James B. Marbert
Attorney, Agent, or Firm—William A. Drucker

[57] ABSTRACT

A universal tool consists of a structure, made by bending a wire of stainless steel or the like to form a handle and two grip legs integral with said handle and having a substantially U-shaped form. By dimensioning one of said grip legs smaller than the other one the former may pass through said other one when the handle is compressed.

5 Claims, 3 Drawing Figures

UNIVERSAL TOOL

This invention refers to a universal tool having resilient legs. The tool can be used to hold, grip and suspend objects of various kinds. The new tool may thus be used for a number of purposes. Thus, it is well suited to serve as a clothes-pin but it is also useful as a gripping tool, as a combined gripping and suspension device etc.

The objects and the structure of the invention will be disclosed in the following specification and the claims.

The accompanying drawing illustrates two exemplifying embodiments of the invention, and FIG. 1 is a perspective view of a first embodiment of the invention;

Figure 1:
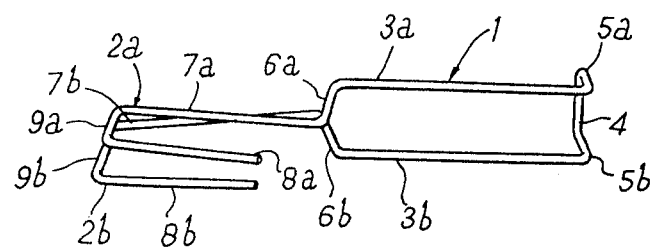

The tool illustrated in FIG. 1 is made by bending a single wire, for example of a stainless material, having suitable yielding characteristics in such a manner that a handle portion is formed having the general reference numeral 1 and two grip legs having the general reference numerals 2a, 2b respectively. The handle portion is substantially reversed U-shaped, and the legs 3a, 3b thereof are connected to the web portion 4 by portions 5a, 5b bent out of the plane of the web portion 4. Said web portion and the bent portions 5a, 5b define in combination a hook shaped portion giving the required strength and stability to the tool and said hook shaped portion may also serve as a suspension hook. By bent portions 6a, 6b the arms 3a, 3b of the handle portion merge into the upper portion of the grip legs, having reference numerals 7a and 7b, respectively. Said portions 7a, 7b of the grip legs are preferably somewhat diverging for a purpose to be disclosed. Said portions merge into end portions 8a, 8b via portions 9a, 9b perpendicular thereto and said end portions 8a, 8b extend substantially parallel to said portions 7a, 7b.

When it is desired to use the tool to grip and hold an object, the arms 3a, 3b of the handle portion are simply brought towards each other to such an extent that the grip portion 7a, 8a, 9a passes through the grip portion 7b, 8b, 9b. By virtue of the resilient deformation thereby taking place and since the portions 7a, 7b thereafter are substantially parallel or converging, a reliable holding of an object is obtained when the legs of the handle portion are permitted to spring back. When desired, thereafter the tool having the object as a load may be suspended by the hook defined by the portions 4 and 5a, 5b. Especially, when using the tool as a clothes-pin it is important that said tool also may be so applied over a clothes-line that it may not unintentionally leave the same. This is obtained when primarily the tool is applied over the clothes-line. When the grip legs thereafter are made operative to hold a garment or the like the unintentional release of the tool from the clothes-line is made impossible. On the other hand, the release is performed in the simplest manner when the garments or the like have been released from the tool. If the product is used as a clothes-pin the web portion 4 of the tool may further be bent to accommodate the section of the clothes-line. As mentioned in the preamble of this description, the tool may be used for the most varying fields of application. In case the need is to grip and release an object in an easy manner, as is the case with a pair of tweezers, it is sufficient to bring the grip legs towards each other by compressing the handle such that said grip legs grip the object. Hereby, the grip portion 7a, 8a, 9a does not pass through the grip portion 7b, 8b, 9b as described above, and thus the grip legs immediately drop the object when the pressure upon the handle portion ceases. In both these cases, it is consequently the opposing surfaces of the portions 7b, 8b, 9b and 7a, 8a, 9a that are operative.

In the illustrated embodiment the free ends of the end portions 8a, 8b are not connected to the portions 7a, 7b but in some cases it may be suitable to provide such a connection between for instance portions 7a and 8a.

Figure 2:
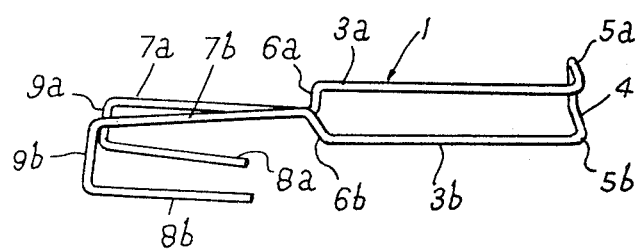
FIG. 2 shows said first embodiment having the legs thereof locked.

Among other possibilities to modify the tool of FIG. 1 it may be mentioned that one or both of the handle arms 3a, 3b, for example in the vicinity of the web portion 4 may have hook shaped portions permitting suspension of the tool also perpendicularly to the suspension direction obtained when the portion 4, 5a, 5b is used as a suspension hook. By locking the legs in relation to each other according to FIG. 2, which is made by holding arm 3b, and swinging arm 3a to such an extent that portion 8a passes portion 7b and then pressing down arm 3a such that portions 7a, 8a, 9a pass under portions 7b, 8b, 9b whereupon arm 3a is swung in the opposite direction, the tool may serve as a key holder, as a supporting means for electrical cables and the like.

Figure 3:
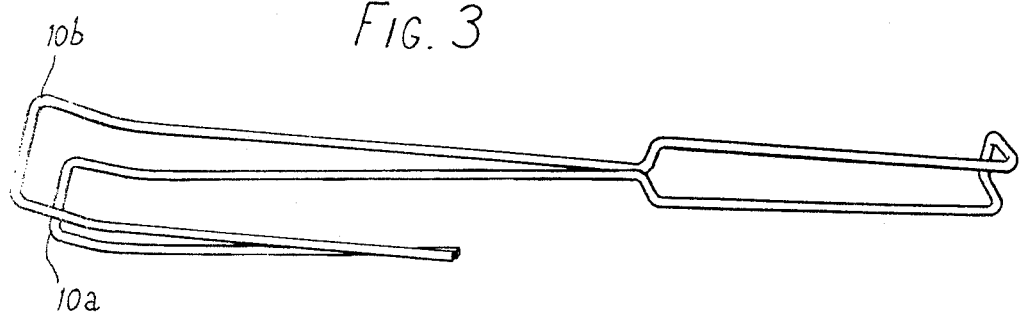
FIG. 3 is a perspective view of a second embodiment of the invention.

The tool illustrated in FIG. 3 differs from the tool just described mainly by the length of the arms and legs and by the end portions 10a, 10b being bent. This tool may also be used as a whisk, as a fasting instrument or the like.

What I claim is:

1. A tool, for gripping articles, consisting of a piece of resilient metal wire bent to provide:
   (i) a handle portion having two arms lying side by side substantially in a same plane and spaced from each other by the length of a connecting web at one end of the arms,
   (ii) two grip legs each forming a continuation of the other end of a respective arm, each grip leg being substantially U-shaped and having its general plane substantially perpendicular to the plane of the arms, one of said grip legs being of lesser dimensions than the other grip leg such that said one grip leg may pass freely through the other grip leg when said other ends of the handle arms are moved towards each other with resilient deformation of said arms and of said web.

2. A tool, as claimed in claim 1, wherein said one ends of the arms are connected to said web by respective connecting portions which lie in a plane different from the plane of the arms, whereby said connecting portions and said web together form a hook on the handle.

3. A tool, as claimed in claim 1, wherein the grip legs, in the non-deformed condition of the handle, are spaced from each other sufficiently for passage of a clothes line between them and into a position within the handle portion.

4. A tool, as claimed in claim 1, wherein the grip legs, in the non-deformed condition of the handle, are divergent towards their ends remote from the handle and, in the condition when one grip leg has been passed through the other, are convergent towards their ends remote from the handle.

5. A tool, as claimed in claim 1, wherein each grip leg has a portion, at its end remote from the handle, bent obliquely to the general plane of the grip leg.

* * * * *